United States Patent
Hall et al.

(10) Patent No.: US 8,250,523 B2
(45) Date of Patent: Aug. 21, 2012

(54) SOURCE CODE WRAPPER GENERATION

(75) Inventors: Matthew Hall, Seattle, WA (US); Michael Fanning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 12/362,091

(22) Filed: Jan. 29, 2009

(65) Prior Publication Data

US 2010/0192124 A1  Jul. 29, 2010

(51) Int. Cl.
*G06F 9/44* (2006.01)

(52) U.S. Cl. ........ 717/106; 717/107; 717/122; 717/118; 717/104; 717/116

(58) Field of Classification Search .................... 717/106
See application file for complete search history.

(56) References Cited

U.S. PATENT DOCUMENTS

| | | | |
|---|---|---|---|
| 6,295,645 B1 * | 9/2001 | Brewer | 717/178 |
| 7,472,375 B2 | 12/2008 | Ye et al. | |
| 2004/0098707 A1 * | 5/2004 | Tang et al. | 717/130 |
| 2004/0098731 A1 | 5/2004 | Demsey et al. | |
| 2004/0158813 A1 * | 8/2004 | Xia et al. | 717/116 |
| 2004/0172640 A1 * | 9/2004 | Luo et al. | 719/328 |
| 2006/0150188 A1 * | 7/2006 | Roman et al. | 718/104 |
| 2006/0225033 A1 * | 10/2006 | Ye et al. | 717/106 |
| 2007/0039010 A1 | 2/2007 | Gadre | |
| 2007/0260629 A1 | 11/2007 | Tseitlin et al. | |
| 2007/0294679 A1 | 12/2007 | Bobrovsky et al. | |
| 2008/0148292 A1 * | 6/2008 | Goetz | 719/320 |
| 2008/0216063 A1 | 9/2008 | Krasnoiarov | |
| 2008/0244578 A1 | 10/2008 | Yoav et al. | |

OTHER PUBLICATIONS

"Generate Custom Managed C++ Wrappers for Easier COM Interoperation Using DCOMSuds", http://msdn.microsoft.com/en-us/magazine/cc188746.aspx.
"Creating C Wrappers for Intel Integrated Performance Primitives Using Microsoft .Net Interoperability Mechanisms", 2003, http://cache-www.intel.com/cd/00/00/21/93/219300_interop.pdf.

* cited by examiner

*Primary Examiner* — Hung T Vy
*Assistant Examiner* — Lynda Dinh
(74) *Attorney, Agent, or Firm* — Microsoft Corporation (57) ABSTRACT

It may be advantageous to facilitate communication between two types of source code. For example, a wrapper may be generated to translate between managed source code and native source code. Current techniques may translate a single type of native source code into a managed binary wrapper. However, as provided herein, a managed source code wrapper may be generated based upon a variety of native source code formats. A native binary descriptor describing a set of native code may be received. A provider may be selected based upon the format of the set of native code. The provider may be executed upon the native binary descriptor to produce a common native binary description. A managed source code wrapper may be generated based upon the common native binary description. Because the managed source code wrapper may be in a textual source code format, a developer may easily maintain and/or customize the wrapper.

16 Claims, 7 Drawing Sheets

SOURCE CODE WRAPPER GENERATION

BACKGROUND

Parallel development of source code using multiple programming languages may occur within a programming environment. It may be advantageous to create communication channels and/or wrappers around programming systems and/or other arrangements that have their own metadata description formats. For example, a computer application developed in managed code (e.g., C# programming language) may attempt to open a web browser developed in a native code (e.g., programming language in XPCOM format). To facilitate communication between different programming languages, a wrapper may be generated. The wrapper may expose objects within a programming language (e.g., native code) to other programming languages (e.g., managed code), thus providing interoperability between the programming languages. However, wrappers produced by existing tools provide limited control, flexibility, and/or customization to developers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for generating a managed source code wrapper that provides control, flexibility, and/or customization to developers is disclosed herein. A native binary descriptor corresponding to a set of native code may be received. The native binary descriptor may comprise arbitrary descriptions of native code (e.g., a description in a native metadata format). A provider may be executed upon the native binary descriptor to produce a common native binary description. The provider may translate the native binary descriptor into a common universal format that maps directly to data types offered by managed code. The provider may be selected from a set of providers based upon the set of native code (e.g., if the set of native code comprises C++ source code, then a C++ provider may be selected). The common native binary description may be in a universal format independent of the type of provider and/or the type of native code it was derived from.

A managed source code wrapper may be generated based upon the common native binary description and/or managed metadata. The managed source code wrapper may comprise at least one source code file generated in a managed source code language (e.g., C#, VB.NET, etc.). During generation, a configuration file may comprise user-defined data. The user-defined data allows customization and flexibility in generating the managed source code wrapper. Because the managed source code wrapper is generated in a managed source code language, a developer may easily maintain and customize it. For example, a developer may specify user-defined data comprising custom marshalling code, a type of source code to generate the managed source code wrapper in, native interfaces to exclude in the managed source code wrapper, and/or other user-defined data. The managed source code wrapper may be used to facilitate interoperability (e.g., marshalling of communication) between managed source code and the set of native source code.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Some programming projects may involve source code from multiple programming languages. It may be appreciated that source code may be interpreted to comprise programming systems, runtimes, and/or binary (e.g., a .TLB file) having their own metadata format descriptions, for example. Communication between these programming languages may be facilitated through a translation layer. The translation layer may act as a wrapper around source code (e.g., native source code) in order to expose data types, objects, and/or interfaces to other source code (e.g., managed source code). The translation layer may translate between the different programming languages (e.g., managed data types and native data types) through marshalling.

Currently, the translation layer may be hand-authored by a developer in a textual source code format as a wrapper. However, hand-authoring the wrapper may be a very tedious task that is prone to human error (e.g., resulting in bugs that are hard to indentify at runtime). The wrapper may also be automatically generated by tools that are less prone to error. Existing tools produce a managed binary wrapper as an output. The tools that generate a managed binary wrapper may be less prone to human error, but they lack the flexibility of the textual source code format of hand-authored wrappers.

The managed binary wrappers produced by existing tools do not provide control, flexibility, and customization to developers at least because of the binary format. For example, if a developer desires to change a managed binary wrapper, then the developer may have to interpret and/or make changes in binary. In another example, if the source code that is wrapped changes, then the managed binary wrapper would have to be re-created every time because it is difficult to track changes in binary. Another drawback is the lack of customized marshalling. For example, if a wrapper generation tool does not understand interfaces (e.g., data types) of the source code to be wrapped, then the developer may be unable to supply additional marshalling functionality that may be included within a generated wrapper. Yet another problem with managed binary wrappers is that the entire managed binary wrapper is consumed, thus undesirable pieces of the managed binary wrapper may not be excluded (e.g., a developer is only interested in a small subset of a large API). This may lead to increased development costs (e.g., a security review may be performed against all code whether used or not). Other problems may include difficulty in debugging the managed binary wrapper at a source code level and minimal customization over the output of the managed binary wrapper. Often, a developer may use an additional tool to decompile the generated managed binary wrapper into a textual source code format to work around these limitations.

As provided herein, a technique for generating a managed source code wrapper. This technique may consume native binary descriptors corresponding to a set of native code to generate a managed source code wrapper. The native binary descriptors may be translated into a universal format for the generation of the managed source code wrapper. In contrast to prior techniques that exclusively consume a single native format, the native binary descriptor may comprise arbitrary descriptions of various native source codes, thus allowing for consumption of a variety of different native codes.

A provider model may be utilized to translate a native binary descriptor (e.g., native metadata) into a universal format (e.g., a common native binary description). A provider selected from a set of providers may be executed upon the native binary descriptor to produce a common native binary description. The provider may be selected based upon the native code that is to be wrapped. For example, a C++ provider may be executed upon a C++ native binary descriptor. Regardless of the provider and/or the native code that is to be wrapped, the common native binary description may be in a common universal format. The common native binary description may comprise commonalities of the native code and managed source code.

To enhance customization in generating the managed source code wrapper, a configuration file comprising user-defined data may be consumed. In one example, a user may specify which interfaces within the native code the user is interested with. This allows the user to configure the descriptive nature of the managed source code wrapper. Because the native code may have a large number of interfaces, resources and/or time may be mitigated by specifying a specific set of interfaces to be included in the managed source code wrapper. In another example, the user may supply custom marshalling code to be used within the managed source code wrapper. This may allow the user to provide additional translation functionality to the managed source code wrapper. This may be advantageous because parameters within the native code may not have equivalents and/or may be translated incorrectly by the managed source code wrapper. In yet another example, the user-defined data may specify the type of source code and/or number of source code files generated. For example, the user may desire a single VB.NET source code file as the managed source code wrapper. During generation of the managed source code wrapper, a source code output generator may be selected to generate the managed source code wrapper in a specific source code format.

Unlike current techniques, a variety of native code formats may be consumed through arbitrary descriptions of the native code. Furthermore, the output wrapper is not limited to a binary file, but may be source code files in a format designated by a user. Finally, the user may customize the output wrapper though user-defined data within a configuration file. Because the output wrapper may be in a text based source code format, a user may be able to further customize, manage, and/or maintain the output wrapper by editing the source code files of the output wrapper. The user may be able to write a new provider to perform optimization and/or arbitrary transformations. Arbitrary code may be inserted as part of generating a common descriptor, for example, and/or as part of generating a source code wrapper.

Figure 1:
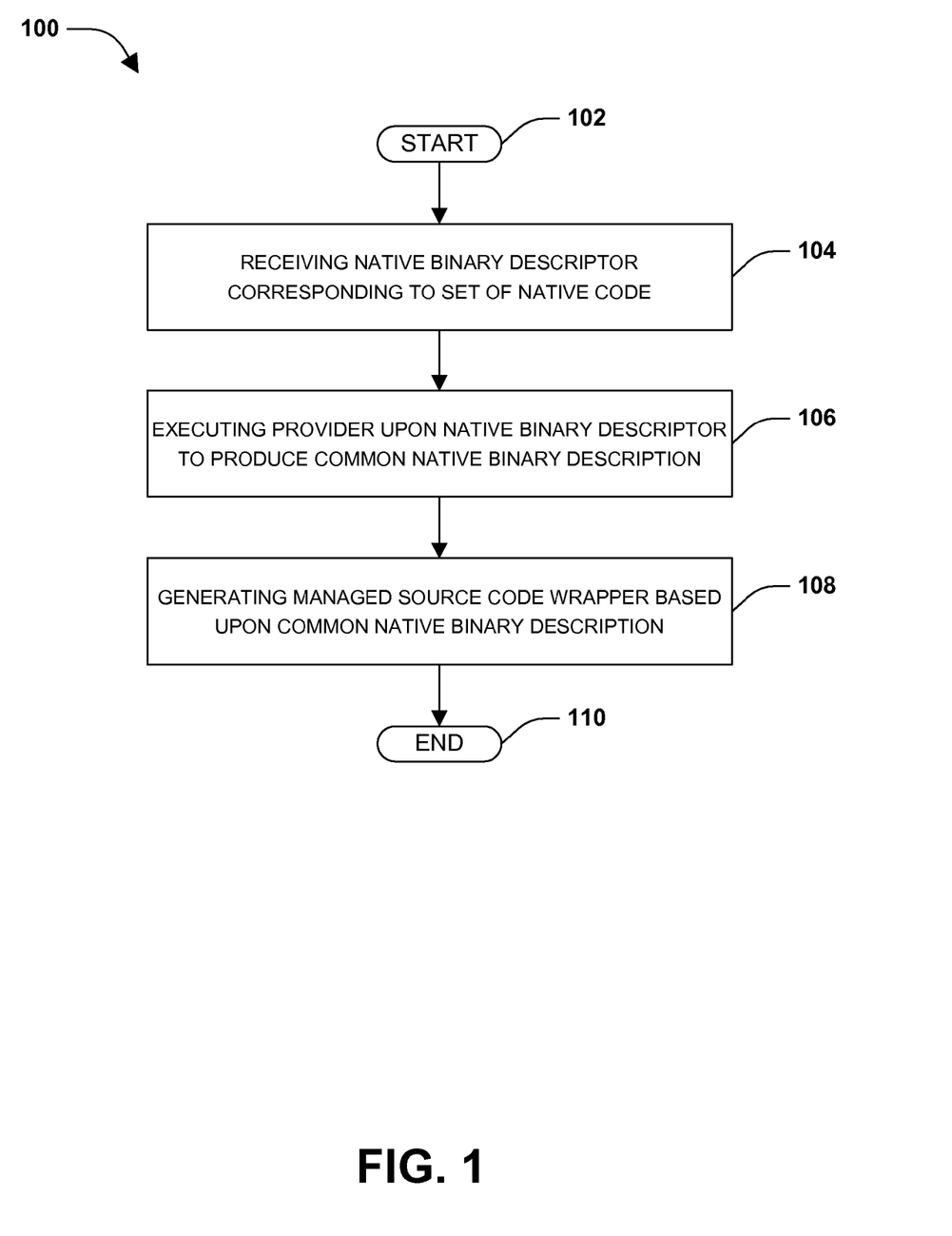
FIG. 1 is a flow chart illustrating an exemplary method of generating a managed source code wrapper.

One embodiment of generating a managed source code wrapper is illustrated by an exemplary method 100 in FIG. 1. At 102, the method begins. At 104, a native binary descriptor corresponding to a set of native code is received. For example, a developer may be developing a project comprising managed source code (e.g., C#) and native source code (e.g., a set of native code corresponding to an XPCOM format) in parallel. To facilitate communication between the managed source code and the set of native code, a wrapper may be generated to wrap the set of native code to expose functionality (e.g., interfaces, data types, etc.) to the managed source code. The native binary descriptor may be any arbitrary description of the set of native source code. The native binary descriptor only has to sufficiently describe the set of native code. For example, the native binary descriptor may comprise native code metadata comprising primitive types, native types to be mapped, and/or native types that are not describable in managed source code.

At 106, a provider may be executed upon the native binary descriptor to produce a common native binary description. The provider may be selected from a set of providers based upon the set of native code. For example, an XPCOM provider may be selected based upon a set of native code corresponding to an XPCOM format. The common native binary description (the output of the execution) is in a universal format that does not depend upon the native binary descriptor, the format of the native code, and/or the provider. That is, the content of the common native binary description may differ, but the format does not. The method 100 may generate wrappers based upon a variety of native code formats because the common native binary descriptor is in a universal format.

At 108, a managed source code wrapper may be generated based upon the common native binary description and/or managed metadata. In one example, at least one native type within the set of native code (e.g., described within the common native binary description) may be iterated over to create a mapping to at least one managed data type. It may be appreciated that the managed source code wrapper may comprise managed source code (e.g., not limited to binary code) and that a user may specify through user-defined data within a configuration file the type of managed source code (e.g., C#, VB.NET, etc.). A source code output generator may be selected to create the managed source code wrapper in a desired source code language (e.g., user specifies an output source code type designation within a configuration file).

Customization may be enhanced through a configuration file that may be received. The configuration file may comprise user-defined data. For example, user-defined data is not limited to but may comprise an XML description of functions and parameter types; a set of exclusion data; a set of override data corresponding to naming policies and translation types; a set of custom marshalling code; a file number output; an automatic generation request corresponding to security, performance, and/or logging. The user-defined data may be used during the generation of the managed source code wrapper to control the generating. For example, a user-defined set of exclusion data may be used to determine which native code interfaces (e.g., functions) may be excluded within the managed source code wrapper because they are undesirable by the user. This allows native code interfaces to be preserved. In another example, the user may supply a set of custom marshalling code to be included within the managed source code wrapper. In yet another example, the user may specify a file number output to control the number of source code files corresponding to the managed source code wrapper.

Because the managed source code wrapper may be configured into a user-defined source code type (e.g., text based programming language format), the managed source code wrapper may be easily modified and further customized once created. This may mitigate resources and/or time in recreating a wrapper because of changes within the native code rendering the wrapper obsolete. If the user modifies a portion of the wrapper, for example, then the configuration file may specify the portion as do not overwrite (e.g., do not overwrite with auto-generated equivalents during subsequent regeneration of the wrapper). This allows the user to preserve user modified portions (e.g., user defined methods, types, etc.) during subsequent regenerations of the wrapper. At 110, the method ends.

Figure 2:
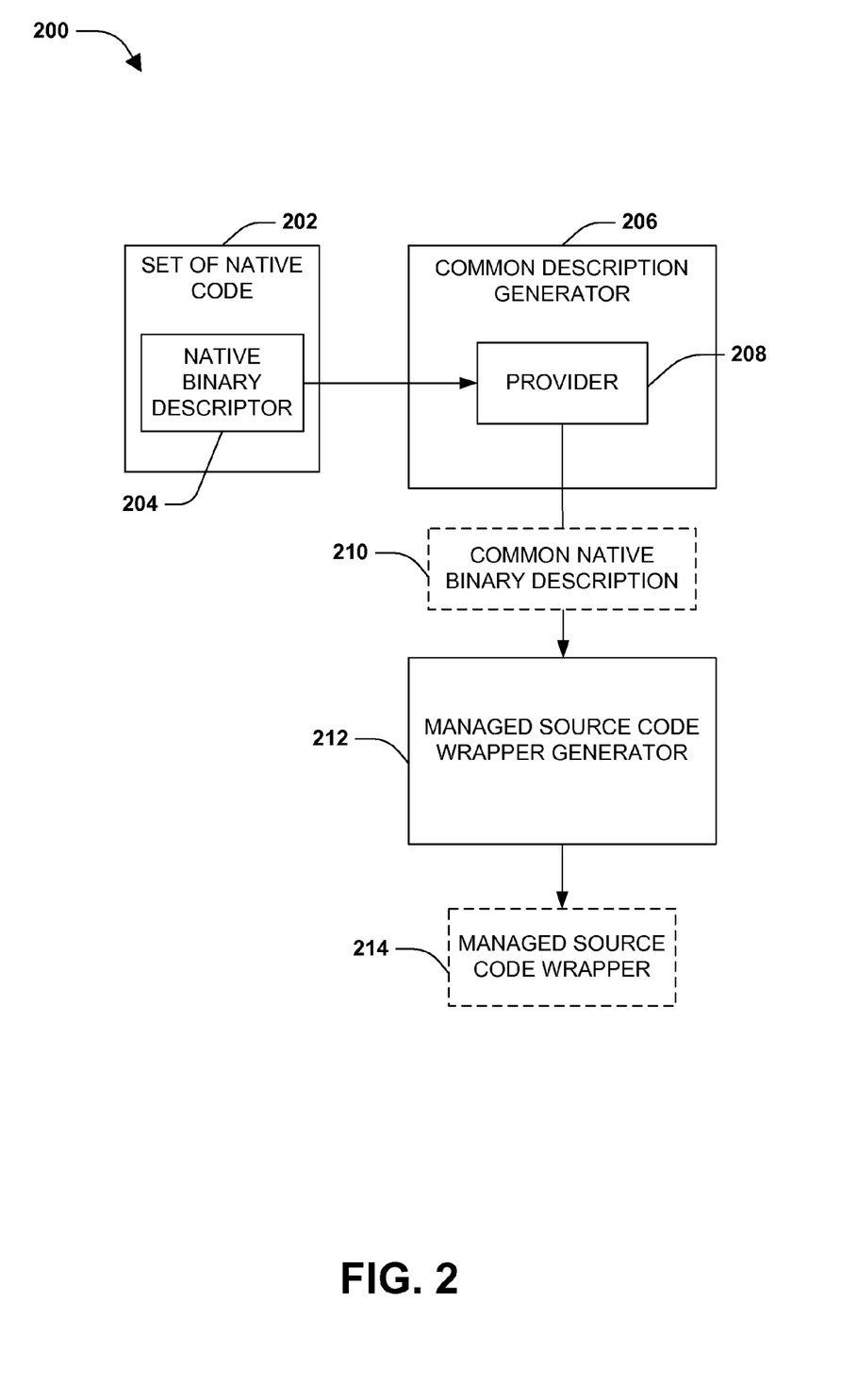
FIG. 2 is a component block diagram illustrating an exemplary system for generating a managed source code wrapper.

FIG. 2 illustrates an example 200 of a system configured for generating a managed source code wrapper. The system may comprise a common description generator 206 and/or a managed source code wrapper generator 212. A native binary descriptor 204 may be associated with a set of native code 202. The native binary descriptor 204 may provide a description of the set of native code 202. In one example, a user may desire a wrapper to be generated for the set of native code 202 to expose interfaces and/or functionality of the set of native code 202. The user may supply the native binary descriptor 204 to the common description generator 206. The common description generator 206 may be configured to receive the native binary descriptor 204.

The common description generator 206 may be configured to execute a provider 208 upon the native binary descriptor 204 to produce a common native binary description 210. The provider may translate the native binary descriptor 204 into a universal format (e.g., the common native binary description 210) that may directly map to data types offered by managed code. The common description generator 206 may be configured to consume a wide variety of native binary descriptors because multiple providers corresponding to different native code formats may be selected for execution. In one example, the native binary descriptor may comprise native code metadata comprising primitive types, native types to be wrapped, and/or native types that are not describable in managed source code. The non-describable native types may be treated in a generic way, such as through a simple pointer, devoid of type information.

The managed source code wrapper generator 212 may be configured to generate a managed source code wrapper 214 based upon the common native binary descriptor 204. In one example, the managed source code wrapper generator 212 may be configured to iterate over native types described in the common native binary description 210 to create mappings to managed data types. In contrast to prior techniques, the managed source code wrapper generator 212 may generate the managed source code wrapper 214 in a variety of programming languages, which may be specified as user-defined data within a configuration file. The managed source code wrapper generator 212 may select an appropriate source code output generator based upon the desired source code type.

In one example of generating the managed source code wrapper 214, the managed source code wrapper generator 212 may create mappings based upon the common native binary description 210 to create the managed source code wrapper 214. The managed source code wrapper generator 212 may determine which interfaces (e.g., methods, data types, etc.) directly map to the desired output source code format. A direct mapping may be created for these interfaces. The managed source code wrapper generator 212 may determine which interfaces are undesirable or not describable to the user. These undesirable interfaces may be subbed out. For example, an IntPtr type in C# may be used in place of the undesirable interfaces. In contrast, current wrapper generators may fail because a single piece of data may be missing. The managed source code wrapper generator 212 may determine which interfaces are not describable in the desired output source code format. Custom marshalling code may be injected to provide the mapping of the indescribable interfaces to avoid error. The managed source code wrapper 214 may be generated based upon these mappings and/or other mappings of the set of native source code to managed source code.

Figure 3:
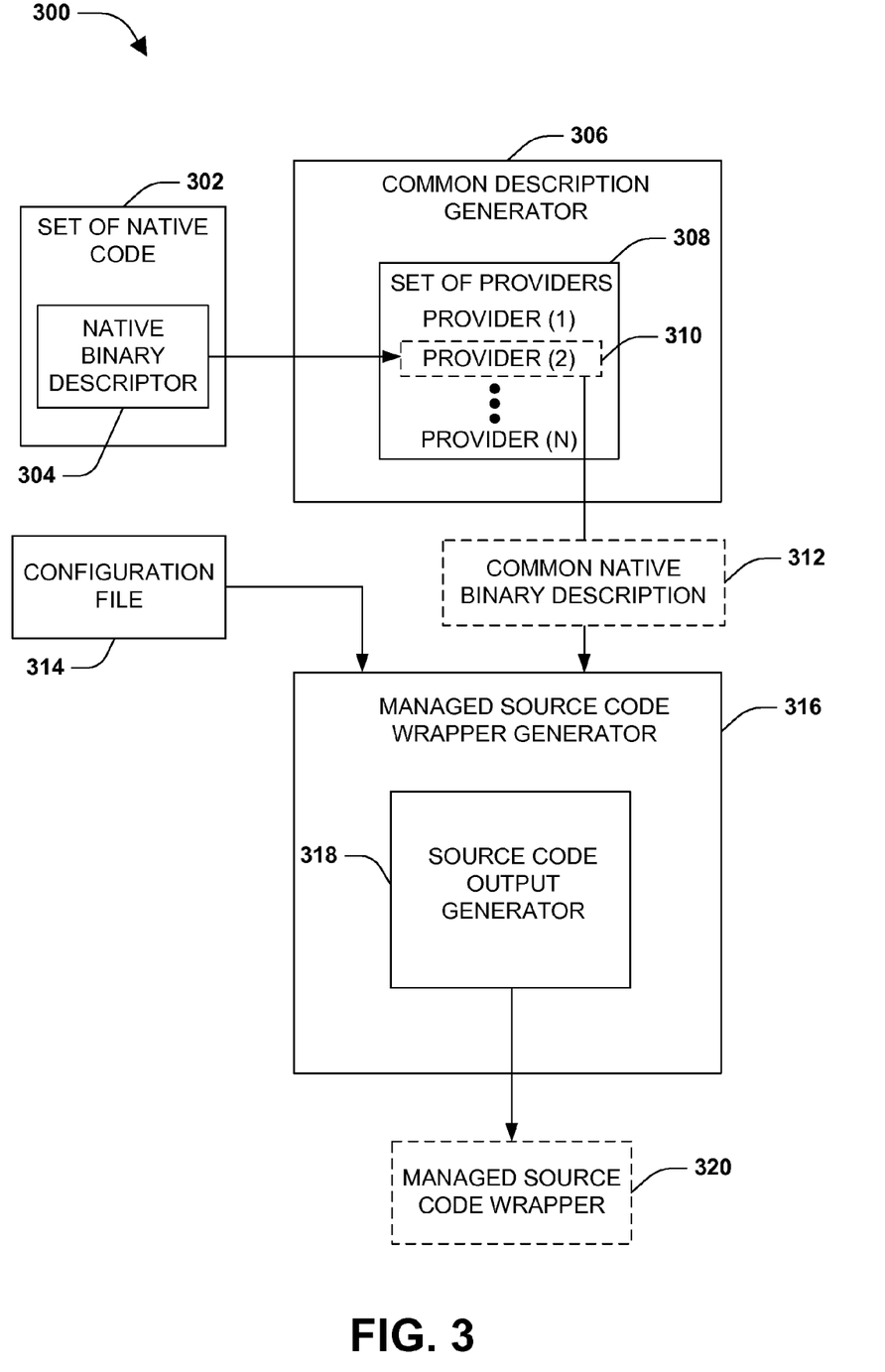
FIG. 3 is an illustration of an example of generating a managed source code wrapper.

FIG. 3 illustrates an example 300 of a system configured for generating a managed source code wrapper. The system may comprise a common description generator 306 and/or a managed source code wrapper generator 312. The common description generator 306 may be configured to receive a native binary descriptor 304 corresponding to a set of native code 302. The common description generator 306 may be configured to select a provider (e.g., a provider (2) 310) from a set of providers 308. For example, the provider (2) 310 may be selected because it comprises functionality specific to the native binary descriptor 304. The provider (2) 310 may have functionality allowing the translation of native code described by the native binary descriptor 304 into a universal format (e.g., a common native binary description 312). The common description generator 306 may be configured to execute the provider (2) 310 upon the native binary descriptor 304 to create the common native binary description 312.

The managed source code wrapper generator 316 may be configured to receive the common native binary description 312 and/or a configuration file 314. The configuration file 314 may comprise user-defined data. For example, user-defined data may comprise a set of custom marshalling code, a set of exclusion data specifying interfaces to exclude, an output source code type designation, and/or other user-data that may be utilized in customizing the managed source code wrapper 320. In contrast to prior techniques, the managed source code wrapper generator 316 may consume the configuration file 314 to provide a user enhanced control and customization over the outputted wrapper. The managed source code wrapper generator 316 may select a source code output generator 318 to generate the managed source code wrapper 320 in a desired source code format.

Figure 4:
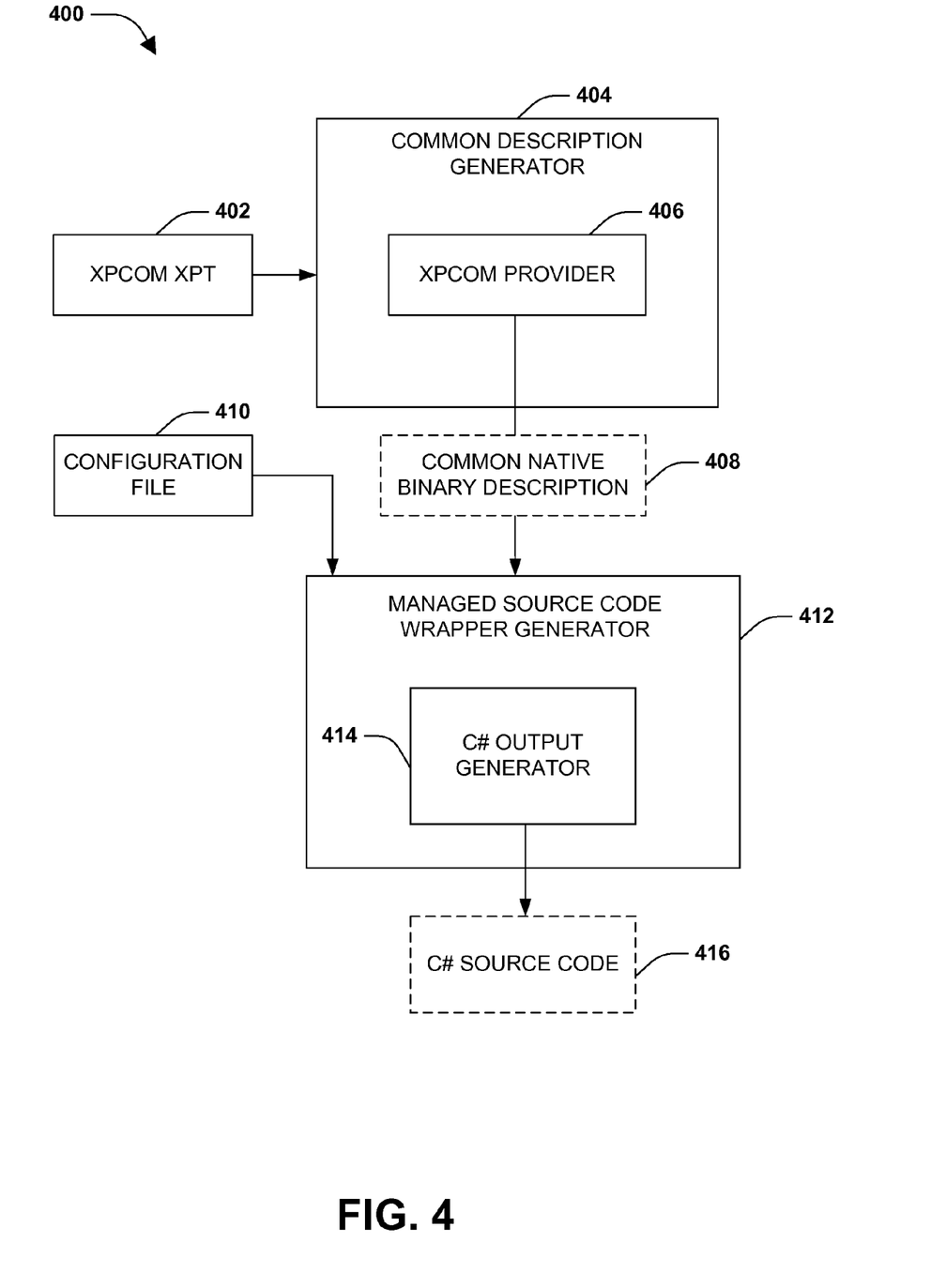
FIG. 4 is an illustration of an example of generating a managed source code wrapper.

FIG. 4 illustrates an example 400 of a system configured for generating a managed source code wrapper. The system may comprise a common description generator 404 and/or a managed source code wrapper generator 412. A developer may be developing a project comprising source code in C# and source code in an XPCOM format. To facilitate communication between the two types of source code, a wrapper may be created to expose functionality (e.g., data types, interfaces) within the XPCOM formatted source code in a managed source code format. The developer may supply a native binary descriptor (e.g., an XPCOM XPT 402) to the common description generator 404. The common description generator 404 may select an XPCOM provider 406 to translate the XPCOM XPT 402 into a common format (e.g., a common native binary description 408).

The developer may specify within a configuration file 410 that the output wrapper is to be in single source code file in a C# format. The developer may provide additional user-defined data within the configuration file 410 (e.g., the developer may specify what interfaces to include within the output wrapper, custom marshalling code for data types that are not describable in managed code, etc.). The managed source code wrapper generator 412 may receive the common native binary description 408 and the configuration file 410. The managed source code wrapper generator 412 may select a C# output generator 414 to generate the C# source code 416 (e.g., the output wrapper) based upon the common native binary description 408 and/or configuration file 410. Thus, the developer may utilize the C# source code 416 to "wrap" around the XPCOM formatted source code/binary to expose functionality that may be accessed through C# source code. The C# source code 416 comprises source code that may be maintained and customized by the developer due to the text based nature of C#.

Figure 5:
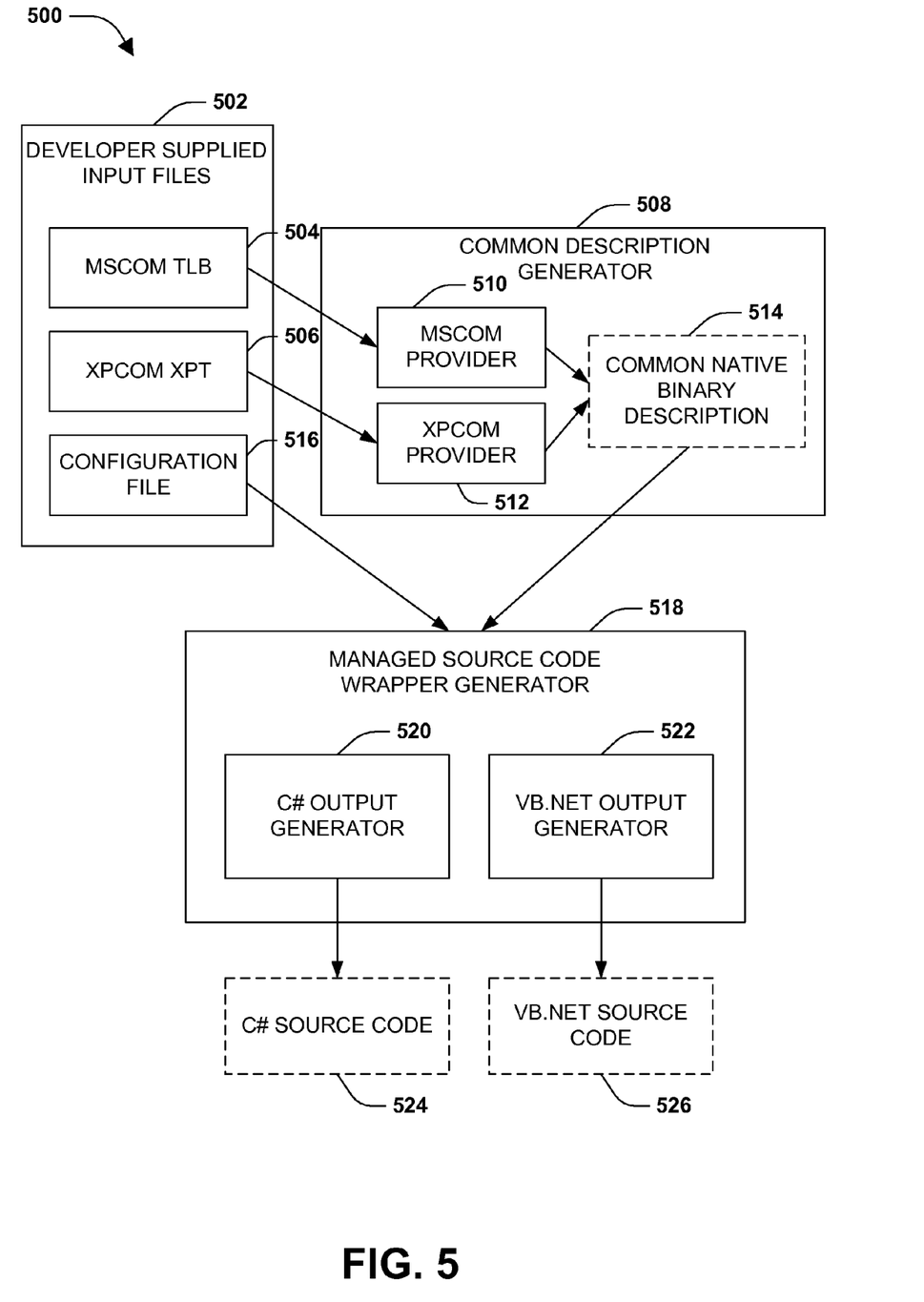
FIG. 5 is an illustration of an example of generating a managed source code wrapper.

FIG. 5 illustrates an example 500 of a system configured for generating a managed source code wrapper. The system may comprise a common description generator 508 and/or a managed source code wrapper generator 518. The common description generator 508 may be configured to receive developer supplied input files 502 (e.g., MSCOM TLB 504 and XPCOM XPT 506) describing native code. The common description generator 508 may select an MSCOM provider 510 to translate the MSCOM TLB 504 descriptor into a universal format. The common description generator 508 may select an XPCOM provider 512 to translate the XPCOM XPT 506 descriptor into the universal format. Because the universal format does not depend upon the input descriptors (e.g., the type of native code they describe), a common native binary description 514 may be created in a format common to both the translated MSCOM TLB 504 and the translated XPCOM XPT 506.

The common native binary description 514 and a configuration file 516 may be received by the managed source code wrapper generator 518. For example, the configuration file 516 may comprise user-defined data specifying the generation of a C# and a VB.NET wrapper. The managed source code wrapper generator 518 may select a C# output generator 520 to generate a C# source code 524 (e.g., a managed source code wrapper). It may be appreciated that in one embodiment the C# source code 524 may comprise separate C# source code files corresponding to native source code in the MSCOM TLB format and to native source code in the XPCOM XPT format. The managed source code wrapper generator 518 may select a VB.NET output generator 522 to generate a VB.NET source code 526 (e.g., a managed source code wrapper). It may be appreciated that in one embodiment the VB.NET source code 526 may comprise separate VB.NET source code files corresponding to native source code in the MSCOM TLB format and to native source code/ binary in the XPCOM XPT format.

Figure 6:
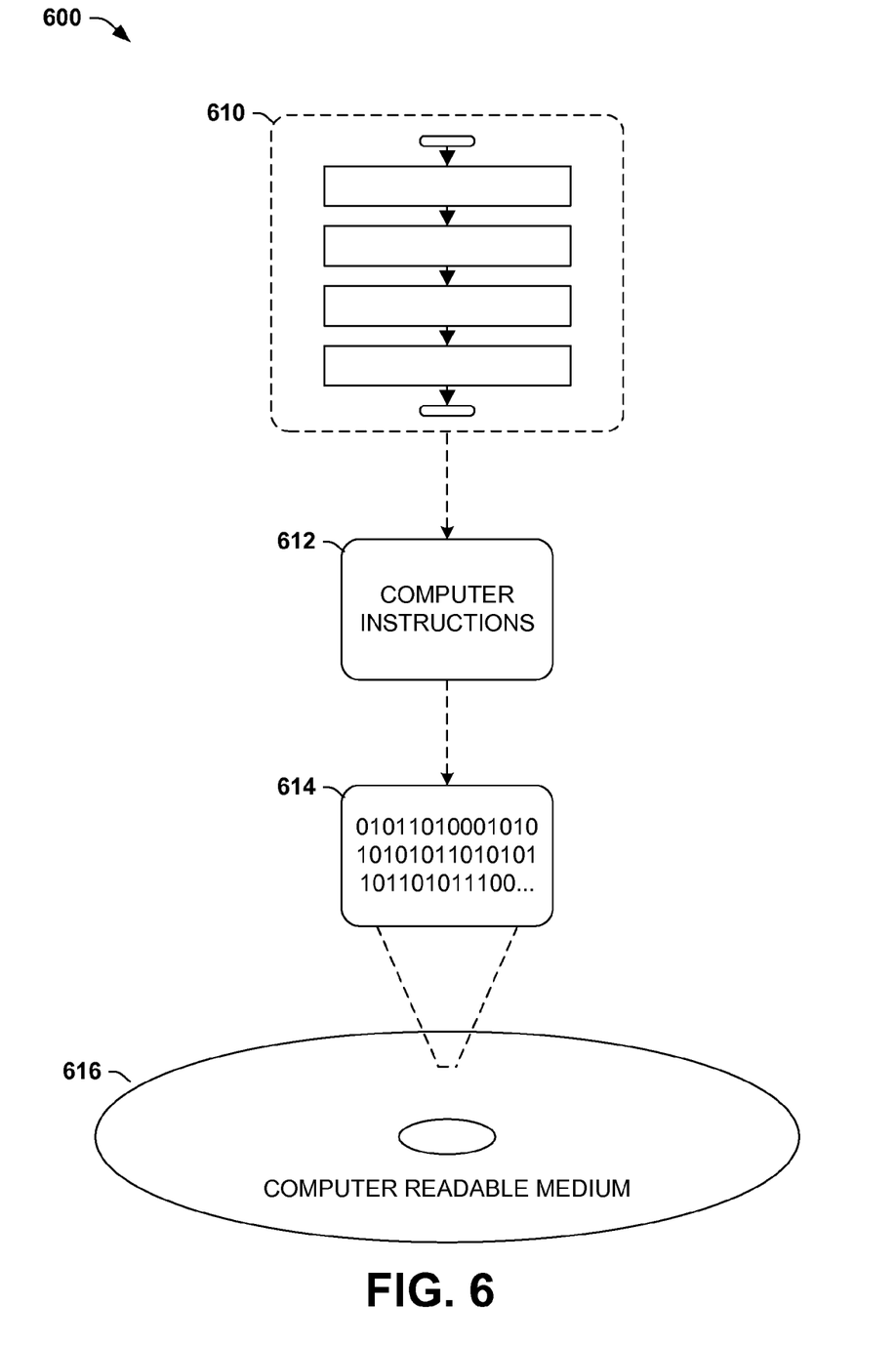
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 610. This computer-readable data 610 in turn comprises a set of computer instructions 612 configured to operate according to one or more of the principles set forth herein. In one such embodiment 600, the processor-executable instructions 614 may be configured to perform a method, such as the exemplary method 100 of FIG. 1, for example. In another such embodiment, the processor-executable instructions 614 may be configured to implement a system, such as the exemplary system of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
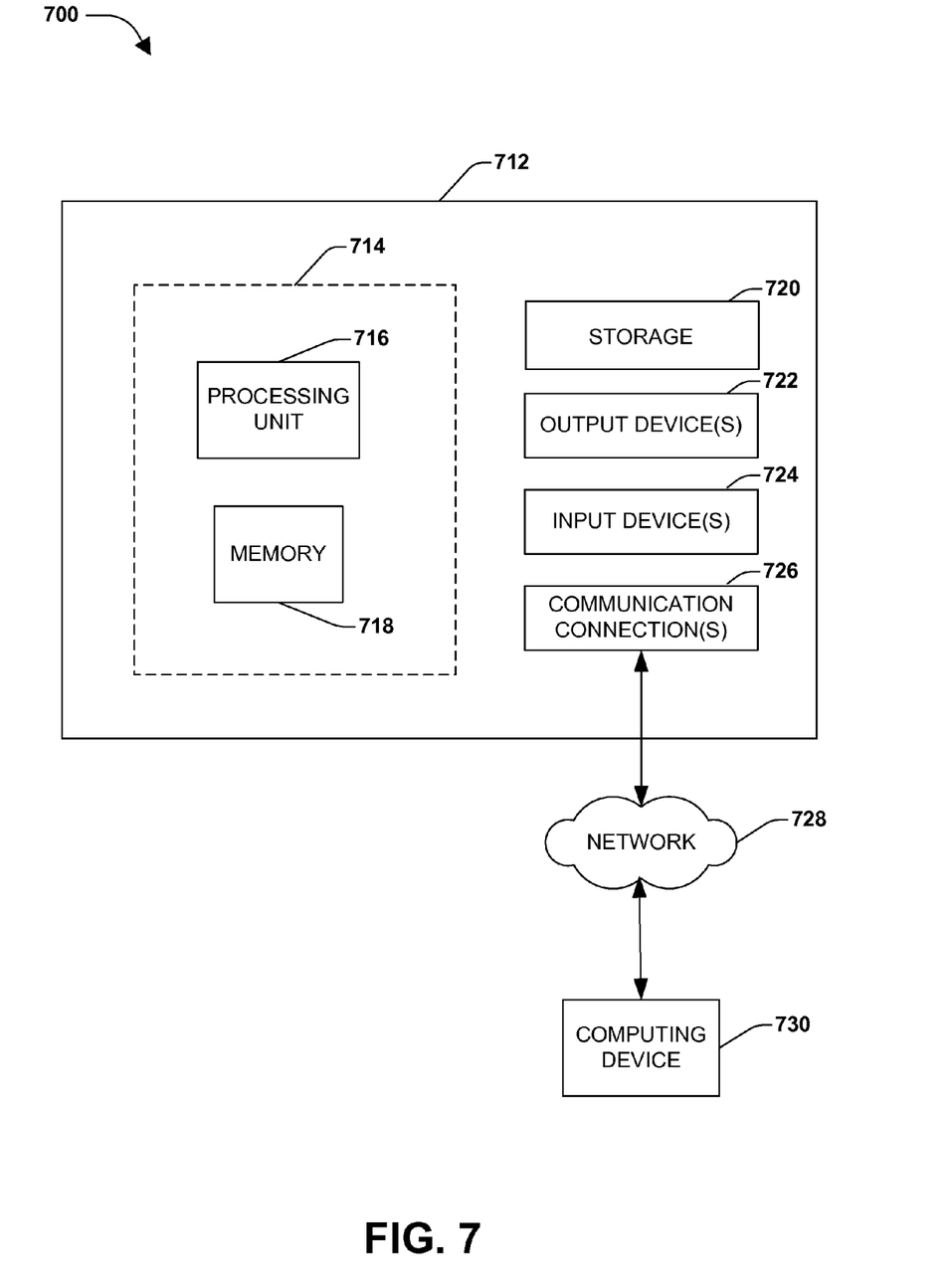
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for generating a managed source code wrapper, comprising:
receiving a native binary descriptor corresponding to a set of native code;
selecting a provider from a set of providers based upon the set of native code;
executing, by a processing unit, the provider upon the native binary descriptor to produce a common native binary description;
receiving a configuration file comprising user-defined data; and
generating a managed source code wrapper based upon the common native binary description and the user-defined data, wherein the user-defined data comprises three or more of:
a set of exclusion data;
a set of override data corresponding to naming:
one or more policies; and
one or more translation types;
a set of custom marshalling code; or
an automatic generation request corresponding to one or more of security, performance, or logging.

2. The method of claim 1, the user-defined data comprising at least one of:
an XML description of functions and parameter types;
a output source code type designation; or
a file number output.

3. The method of claim 1, wherein the generating a managed source code wrapper comprises:
selecting a source code output generator to create the managed source code wrapper in a source code language corresponding to an output source code type designation.

4. The method of claim 1, comprising:
injecting a set of custom marshalling code into the managed source code wrapper.

5. The method of claim 1, comprising:
excluding at least one interface within the set of native code from the managed source code wrapper based upon a set of exclusion data.

6. The method of claim 1, wherein the generating a managed source code wrapper comprises:
iterating over at least one native type within the set of native code to create a mapping to at least one managed data type.

7. The method of claim 1, wherein the native binary descriptor comprises native code metadata, wherein the native code metadata comprises at least one of:
a primitive type mapping directly from the set of native code to managed code within the managed source code wrapper;
a native type that is to be wrapped with the managed source code wrapper;
a native type that is to be translated into a managed primitive; or
a native type that is not describable in managed source code within the managed source code wrapper.

8. A system for generating a managed source code wrapper, comprising:
one or more processing units; and
memory comprising instructions that when executed by at least one of the one or more processing units implement the following:
a common description generator configured to:
receive a native binary descriptor corresponding to a set of native code;
select a provider from a set of providers based upon the set of native code; and
execute the provider upon the native binary descriptor to produce a common native binary description; and
a managed source code wrapper generator configured to:
receive a configuration file comprising user-defined data; and
generate a managed source code wrapper based upon the common native binary description and the user-defined data, wherein the user-defined data comprises three or more of:
a set of exclusion data;
a set of override data corresponding to naming:
one or more policies; and
one or more translation types;
a set of custom marshalling code; or
an automatic generation request corresponding to one or more of security, performance, or logging.

9. The system of claim 8, the user-defined data comprising at least one of:
an XML description of functions and parameter types;
a output source code type designation; or
a file number output.

10. The system of claim 8, wherein the managed source code wrapper generator is configured to select a source code output generator to generate the managed source code wrapper in a source code language corresponding to an output source code type designation.

11. The system of claim 8, wherein the managed source code wrapper generator is configured to exclude at least one interface within the set of native code from the managed source code wrapper based upon a set of exclusion data.

12. The system of claim 8, wherein the managed source code wrapper generator is configured to inject a set of custom marshalling code into the managed source code wrapper.

13. The system of claim 8, wherein
the common description generator is configured to:
receive a managed binary descriptor corresponding to a set of managed code; and
execute a provider upon the managed binary descriptor to produce a common managed binary description; and
the managed source code wrapper generator is configured to generate a managed source code wrapper based upon managed metadata.

14. The system of claim 8, wherein the common native binary description is configured in a universal format describing the set of native code.

15. The system of claim 8, wherein the native binary descriptor comprises native code metadata, wherein the native code metadata comprises at least one of:
a primitive type mapping directly from the set of native code to managed code within the managed source code wrapper;
a native type that is to be wrapped with the managed source code wrapper; or
a native type that is not describable in managed source code within the managed source code wrapper.

16. A computer readable memory comprising instructions that when executed at least in part via a processing unit perform a method for generating a managed source code wrapper comprising:

receiving a native binary descriptor corresponding to a set of native code;

selecting a provider from a set of providers based upon the set of native code;

executing the provider upon the native binary descriptor to produce a common native binary description;

receiving a configuration file comprising user-defined data; and     generating a managed source code wrapper based upon the common native binary description and the user-defined data, wherein the user-defined data comprises three or more of:

a set of exclusion data;

a set of override data corresponding to naming:

one or more policies; and one or more translation types;

a set of custom marshalling code; or an automatic generation request corresponding to one or more of security, performance, or logging.

\* \* \* \* \*